(12) United States Patent
Bihun et al.

(10) Patent No.: US 8,244,720 B2
(45) Date of Patent: Aug. 14, 2012

(54) RANKING BLOG DOCUMENTS

(75) Inventors: Andriy Bihun, Pine Bush, NY (US);
Jason Goldman, San Francisco, CA (US); Alex Khesin, Hoboken, NJ (US);
Vinod Marur, Berkeley Heights, NJ (US); Eduardo Morales, Harrison, NJ (US); Jeff Reynar, New York, NY (US)

(73) Assignee: Google Inc., Mountain View, CA (US)

(*) Notice: Subject to any disclaimer, the term of this patent is extended or adjusted under 35 U.S.C. 154(b) by 113 days.

(21) Appl. No.: 11/224,321

(22) Filed: Sep. 13, 2005

(65) Prior Publication Data

US 2007/0061297 A1    Mar. 15, 2007

(51) Int. Cl.
*G06F 17/30*     (2006.01)

(52) U.S. Cl. ........ 707/723; 707/728; 707/729; 707/730; 707/736

(58) Field of Classification Search .................. 707/1, 3, 707/100, 101, 705, 706, 711, 723, 728, 729, 707/730, 735, 736, 748, 752, 999.001, 999.003, 707/999.005
See application file for complete search history.

(56) References Cited

U.S. PATENT DOCUMENTS

| | | | |
|---|---|---|---|
| 6,421,675 B1 | 7/2002 | Ryan et al. | |
| 6,510,406 B1 | 1/2003 | Marchisio | |
| 7,685,144 B1* | 3/2010 | Katragadda | 707/999.101 |
| 7,693,830 B2* | 4/2010 | Guha | 707/999.003 |
| 7,716,199 B2* | 5/2010 | Guha | 707/706 |
| 7,716,226 B2* | 5/2010 | Barney | 707/748 |
| 7,716,228 B2* | 5/2010 | Sahasrabudhe et al. | 707/748 |
| 7,734,610 B2* | 6/2010 | Rakowski et al. | 707/706 |
| 7,743,045 B2* | 6/2010 | Guha | 707/706 |
| 7,761,447 B2* | 7/2010 | Brill et al. | 707/728 |
| 7,765,209 B1* | 7/2010 | Khesin et al. | 707/736 |
| 7,873,635 B2* | 1/2011 | Wang et al. | 707/735 |
| 8,010,527 B2* | 8/2011 | Denoue et al. | 707/726 |
| 8,060,463 B1* | 11/2011 | Spiegel | 707/609 |
| 8,069,179 B2* | 11/2011 | Chickering et al. | 707/758 |
| 8,112,437 B1* | 2/2012 | Katragadda et al. | 707/769 |
| 8,117,195 B1* | 2/2012 | Dave et al. | 707/730 |
| 8,126,882 B2* | 2/2012 | Lawyer | 707/723 |
| 2005/0060297 A1* | 3/2005 | Najork | 707/3 |
| 2005/0234904 A1* | 10/2005 | Brill et al. | 707/5 |
| 2006/0069663 A1* | 3/2006 | Adar et al. | 707/1 |

(Continued)

FOREIGN PATENT DOCUMENTS

KR    10-2005-0077242 A    8/2005

(Continued)

OTHER PUBLICATIONS

Bloglines, www.bloglines.com, print date—Sep. 12, 2005.

(Continued)

*Primary Examiner* — Charles Rones
*Assistant Examiner* — Rezwanul Mahmood
(74) *Attorney, Agent, or Firm* — Harrity & Harrity, LLP

(57) ABSTRACT

A blog search engine may receive a search query. The blog search engine may determine scores for a group of blog documents in response to the search query, where the scores are based on a relevance of the group of blog documents to the search query and a quality of the group of blog documents. The blog search engine may also provide information regarding the group of blog documents based on the determined scores.

23 Claims, 8 Drawing Sheets

| | RELEVANCE SCORE | QUALITY SCORE | OVERALL SCORE | RANK |
|---|---|---|---|---|
| BLOG DOCUMENT 1 | 1.0 | 0.4 | 1.4 | BLOG DOCUMENT 3 |
| BLOG DOCUMENT 2 | 0.9 | -0.4 | 0.5 | BLOG DOCUMENT 1 |
| BLOG DOCUMENT 3 | 0.8 | 0.8 | 1.6 | BLOG DOCUMENT 4 |
| BLOG DOCUMENT 4 | 0.7 | 0.3 | 1.0 | BLOG DOCUMENT 5 |
| BLOG DOCUMENT 5 | 0.6 | 0.3 | 0.9 | BLOG DOCUMENT 2 |

U.S. PATENT DOCUMENTS

| | | | |
|---|---|---|---|
| 2006/0284744 A1* | 12/2006 | Shotland | 341/50 |
| 2006/0287989 A1* | 12/2006 | Glance | 707/3 |
| 2007/0038646 A1* | 2/2007 | Thota | 707/100 |
| 2007/0050389 A1* | 3/2007 | Kim et al. | 707/101 |
| 2007/0100914 A1* | 5/2007 | Agrawal et al. | 707/205 |
| 2007/0106662 A1* | 5/2007 | Kimbrough et al. | 707/5 |
| 2007/0203891 A1* | 8/2007 | Solaro et al. | 707/3 |
| 2007/0255702 A1* | 11/2007 | Orme | 707/5 |
| 2008/0104128 A1* | 5/2008 | Drayer et al. | 707/200 |
| 2008/0320004 A1* | 12/2008 | Jain et al. | 707/10 |
| 2009/0030862 A1* | 1/2009 | King et al. | 706/45 |
| 2009/0054123 A1* | 2/2009 | Mityagin et al. | 463/9 |
| 2009/0171866 A1* | 7/2009 | Harun et al. | 706/12 |
| 2009/0313116 A1* | 12/2009 | Ashbaugh | 707/10 |
| 2010/0070448 A1* | 3/2010 | Omoigui | 707/748 |
| 2010/0131455 A1* | 5/2010 | Logan et al. | 707/602 |
| 2010/0131505 A1* | 5/2010 | Erickson | 707/736 |
| 2010/0161605 A1* | 6/2010 | Gabrilovich et al. | 707/736 |
| 2010/0191722 A1* | 7/2010 | Boiman et al. | 707/723 |
| 2010/0223261 A1* | 9/2010 | Sarkar | 707/726 |
| 2010/0250513 A1* | 9/2010 | Guha | 707/706 |
| 2010/0325107 A1* | 12/2010 | Kenton et al. | 707/723 |
| 2011/0040787 A1* | 2/2011 | Cierniak et al. | 707/770 |
| 2011/0087673 A1* | 4/2011 | Chen et al. | 707/748 |
| 2011/0093456 A1* | 4/2011 | Ryan et al. | 707/723 |
| 2011/0145219 A1* | 6/2011 | Cierniak et al. | 707/709 |

FOREIGN PATENT DOCUMENTS

| | | |
|---|---|---|
| WO | WO 2005/033978 | 4/2005 |
| WO | WO2005033978 A1 * | 4/2005 |
| WO | WO 2007/033202 | 3/2007 |

OTHER PUBLICATIONS blogpulse, www.blogpulse.com, print date—Sep. 12, 2005.
Technorati, www.technorati.com, print date—Sep. 12, 2005.
Feedster, www.feedster.com, print date—Sep. 12, 2005.
ICEROCKET, www.icerocket.com, print date—Sep. 12, 2005.
MarketingVox, www.marketingvox.com, print date—Sep. 12, 2005.
K. Fujimura et al., "The EigenRumor Algorithm for Ranking Blogs", WWW 2005, May 10, 2005, XP-002409677, http://www.blogpulse.com/papers/2005/fujimura.pdf, pp. 1-6.
K. Fujimura et al., "The EigenRumor Algorithm for Calculating Contributions in Cyberspace Communities", LNAI 3577, XP019013593, Aug. 2005, pp. 59-74.

Y. Medynskiy, "Implicit Links in Asynchronous Communication Spaces", CHI 2005, XP-002409678, Apr. 2, 2005, Cornell University, http://www.socialcomputingresearch.net/chi_papers/Medynskiy.pdf, pp. 1-3.
N. Glance et al., "BlogPulse: Automated Trend Discovery for Weblogs", WWW 2004, XP-002409679, May 17, 2004, New York, USA, http://www.blogpulse.com/papers/www2004glance.pdf, pp. 1-8.
D. Gruhl et al., "Information Diffusion Through Bolgspace", WWW 2004, XP-002409680, May 17, 2004, http://www2004.org/proceedings/docs/1p491.pdf, pp. 491-501.
International Search Report and Written Opinion dated Dec. 13, 2006.
Office Action from Chinese Patent Application No. 200680042202.6, mailed Nov. 13, 2009, 10 pages.
Belle L. Tseng et al., "Tomographic Clustering to Visualize Blog Communities as Mountain Views", WWW 2005 $2^{nd}$ Annual Workshop on the Weblogging Ecosystem, May 10-14, 2005, 6 pages.
Naoto Tanimoto, et al. "The EnginRumor Algorithm for Calculating Reputation of Information Resources in Electronic Communities", IPSJ SIG Technical Report, vol. 2005 No. 3, 2005-DPS-121 Multi-Media Communication and Decentralized Processing 2005-GN-54 Groupware and NetWork Service, IPSJ SIG, Jan. 20, 2005, vol. 2005 No. 3, pp. 37-42.
Shinsuke Nakajima, et al, "Web Information Filtering based on Blog Trust", IPSJ vol. 2004 No. 72, 2004-DBS-134 (II), IPSJ, Jul. 15, 2004, vol. 2004 No. 72, pp. 699-705.
Co-pending U.S. Appl. No. 11/386,083, filed Mar. 22, 2006 entitled "Providing Blog Posts Relevant to Search Results", by Kushal Dave et al., 50 pages.
BlogPulse.com screenshots (http://web.archive.org/web/20050105041813/http://blogpulse.com), Jan. 5, 2005.
BlogPulse: Automated Trend Discovery for Weblogs, Natalie S. Glance et al., (http://web.archive.org/web/20041204045153/http://www.blogpulse.com/papers/www2004glance.pdf), Dec. 4, 2004.
Sergey Brin et al., The PageRank Citation Ranking: Bringing Order to the Web, Jan. 29, 1998 (http://citeseer.ist.psu.edu/page98pagerank.html).

* cited by examiner

| DOCUMENT ID 510 | QUALITY SCORE 520 |
|---|---|
| BLOG DOCUMENT 1 | QUALITY SCORE |
| BLOG DOCUMENT 2 | QUALITY SCORE |
| BLOG DOCUMENT 3 | QUALITY SCORE |
| BLOG DOCUMENT 4 | QUALITY SCORE |
| ... | ... |
| BLOG DOCUMENT N | QUALITY SCORE |

FIG. 5

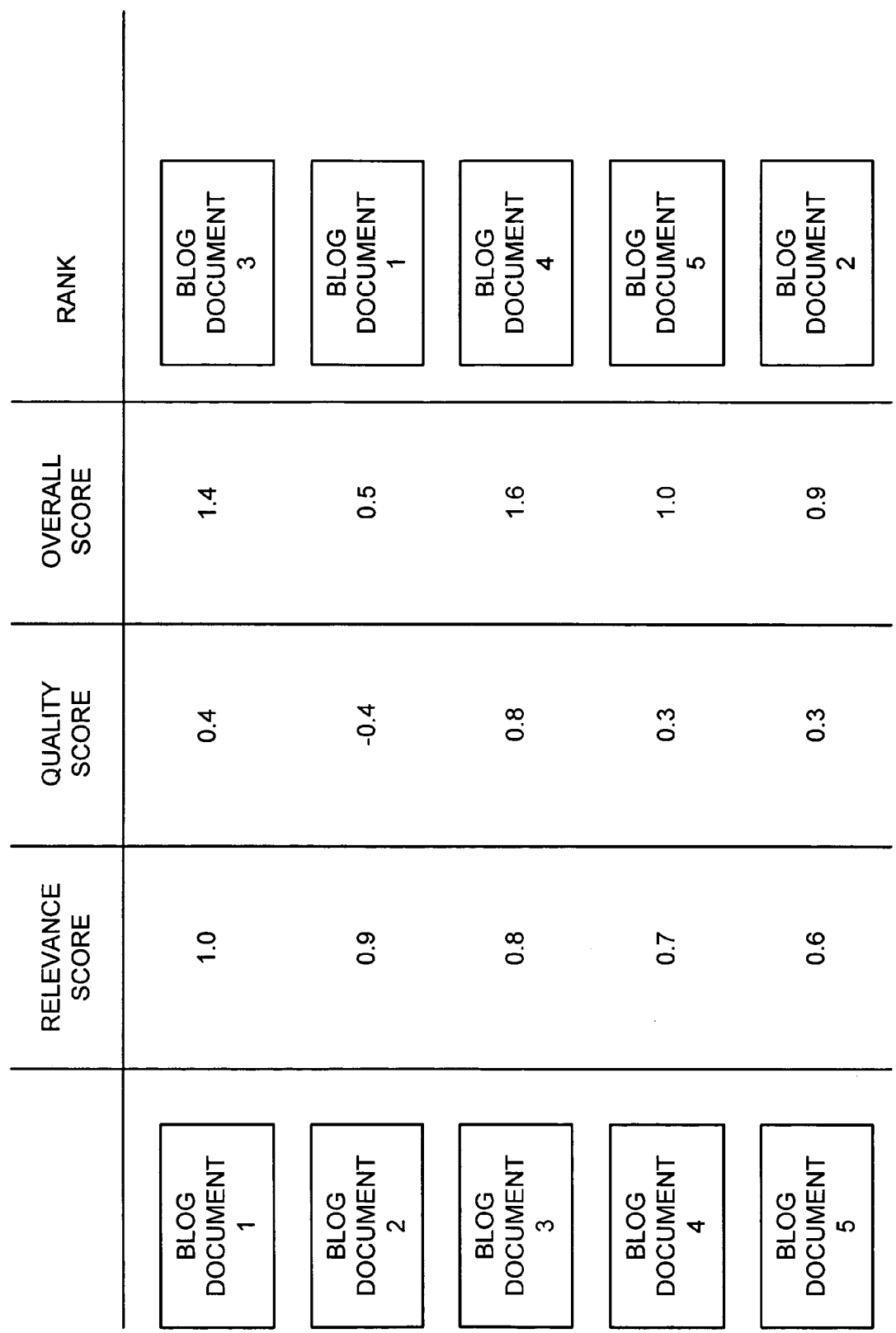

RANKING BLOG DOCUMENTS

FIELD OF THE INVENTION

Implementations consistent with the principles of the invention relate generally to information retrieval and, more particularly, to providing a ranked set of blog documents in response to search queries.

BACKGROUND OF THE INVENTION

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web pages in which a user is interested. Generally, search engines base their determination of the user's interest on search terms (called a search query) entered by the user. The goal of the search engine is to provide links to high quality, relevant results (e.g., web pages) to the user based on the search query. Typically, the search engine accomplishes this by matching the terms in the search query to a corpus of pre-stored web pages. Web pages that contain the user's search terms are identified as search results and are returned to the user as links.

Over the past few years, a new medium, called a blog, has appeared on the web. Blogs (short for web logs) are publications of personal thoughts that are typically updated frequently with new journal entries, called posts. The content and quality of blogs and their posts can vary greatly depending on the purpose of the authors of the blogs. As blogging becomes more popular, the ability to provide quality blog search results becomes more important.

SUMMARY OF THE INVENTION

In accordance with one implementation consistent with the principles of the invention, a method may include receiving a search query at a blog search engine, retrieving a blog document in response to the search query, determining a first score for the blog document based on the relevance of the blog document to the search query, altering the first score based on a quality of the blog document, and providing information regarding the blog document based on the altered first score.

In another implementation consistent with the principles of the invention, a computer-implemented method includes obtaining a blog document, identifying at least one of the positive indicators of a quality of the blog document or negative indicators of the quality of the blog document, and determining a quality score for the blog document based on the identified at least one of positive indicators or negative indicators.

In yet another implementation consistent with the principles of the invention, a method may include receiving a search query at a blog search engine; determining scores for a group of blog documents in response to the search query, the scores being based on a relevance of the group of blog documents to the search query and a quality of the group of blog documents; and providing information regarding the group of blog documents based on the determined scores.

In still another implementation consistent with the principles of the invention, a method may include identifying at least one of the positive indicators of a quality of a blog document or negative indicators of the quality of the blog document, the identified at least one of positive indicators or negative indicators including an indicator specific to blog documents; determining a quality score for the blog document based on the identified at least one of positive indicators or negative indicators; receiving a search query; determining a score for the blog document based on a relevance of the blog document to the search query; adjusting the score of the blog document based on the quality score; and providing information relating to the blog document based on the adjusted score.

BRIEF DESCRIPTION OF THE DRAWINGS

The accompanying drawings, which are incorporated in and constitute a part of this specification, illustrate an implementation of the invention and, together with the description, explain the invention. In the drawings.

FIG. 5 is an exemplary database that may be associated with the server of FIG. 2 in an implementation consistent with the principles of the invention;

FIG. 8 is a diagram of an exemplary set of documents that may be retrieved in an implementation consistent with the principles of the invention.

DETAILED DESCRIPTION

The following detailed description of implementations consistent with the principles of the invention refers to the accompanying drawings. The same reference numbers in different drawings may identify the same or similar elements. Also, the following detailed description does not limit the invention.

Overview

Systems and methods consistent with the principles of the invention improve the quality of blog results provided in response to a search query. To improve the quality of blog results, a number of quality factors may be used to alter (either positively or negatively) a score of the blog results.

Figure 1:
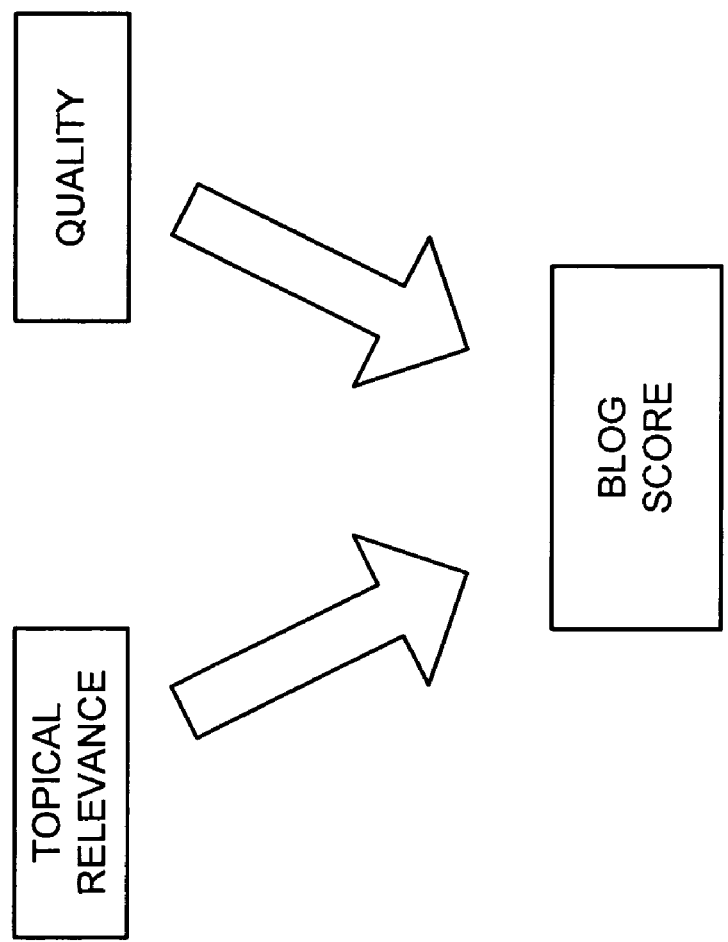
FIG. 1 is an exemplary diagram illustrating a concept consistent with the principles of the invention.

FIG. 1 is an exemplary diagram illustrating a concept consistent with the principles of the invention. As illustrated in FIG. 1, two distinct sets of data are used to determine a score of a blog (or blog post) in response to a search query—the topical relevance of the blog (or blog post) to the terms in the search query and the quality of the blog (or blog post), which is independent of the query terms. The quality of the blog (or blog post) may positively or negatively affect the score of the blog (or blog post).

The phrase "blog document," as used hereinafter, is to be broadly interpreted to include a blog, a blog post, or both a blog and a blog post. It will be appreciated that the techniques described herein are equally applicable to blogs and blog posts. A "document," as the term is used herein, is to be broadly interpreted to include any machine-readable and machine-storable work product. A document may include, for example, an e-mail, a web site, a file, a combination of files, one or more files with embedded links to other files, a news group posting, a blog document, a web advertisement, etc. In the context of the Internet, a common document is a web page. Web pages often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Exemplary Network Configuration

Figure 2:
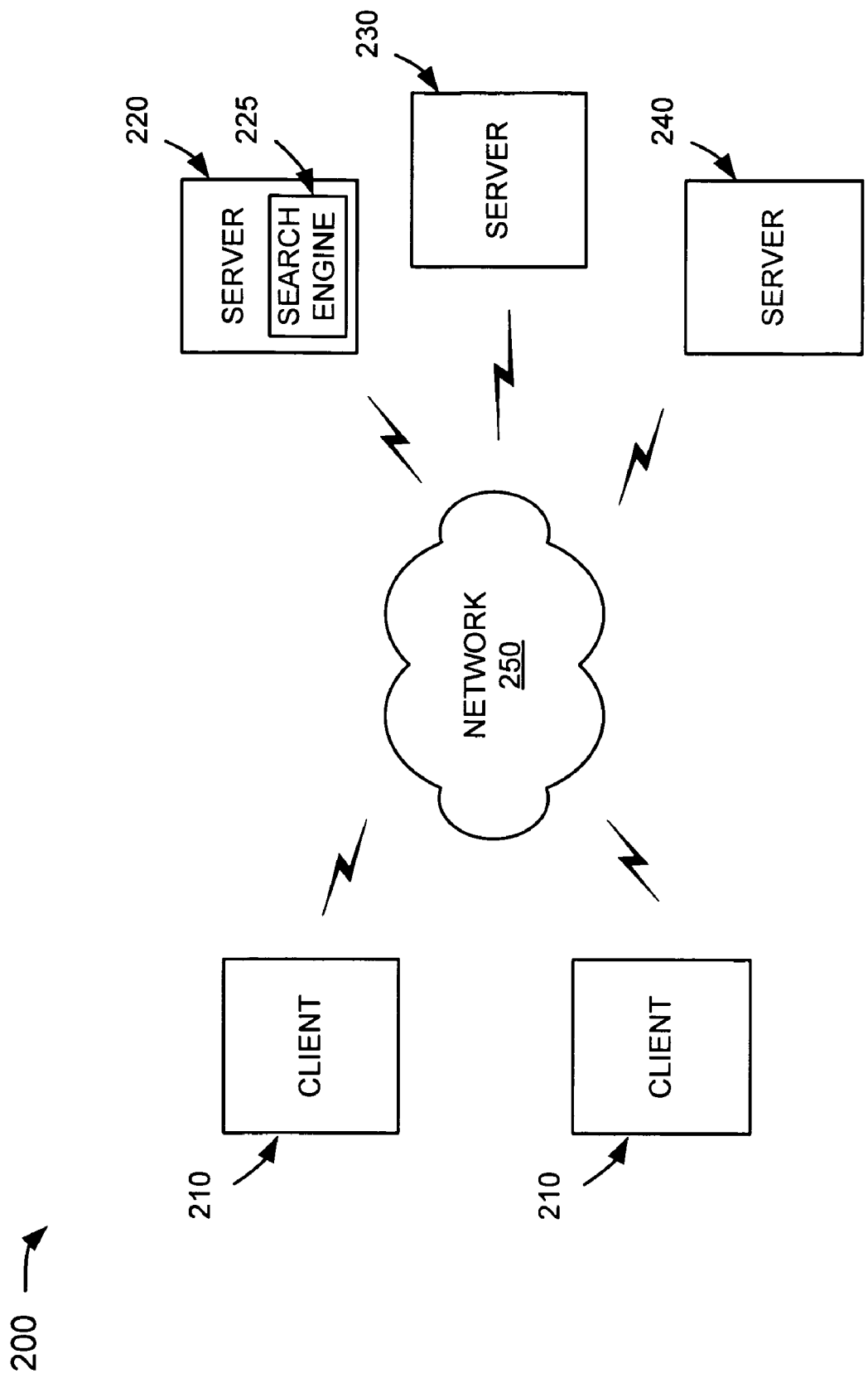
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform a function of a server and a server may perform a function of a client.

Clients 210 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. Servers 220-240 may include server entities that gather, process, search, and/or maintain documents in a manner consistent with the principles of the invention.

In an implementation consistent with the principles of the invention, server 220 may include a search engine 225 usable by clients 210. In one implementation, search engine 225 may include a blog search engine that searches only blog documents. Server 220 may crawl a corpus of documents, index the documents, and store information associated with the documents in a repository of documents. Servers 230 and 240 may store or maintain documents that may be crawled or analyzed by server 220.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Network 250 may include a local area network (LAN), a wide area network (WAN), a telephone network, such as the Public Switched Telephone Network (PSTN), an intranet, the Internet, or a combination of networks. Clients 210 and servers 220-240 may connect to network 250 via wired, wireless, and/or optical connections.

Exemplary Client/Server Architecture

Figure 3:
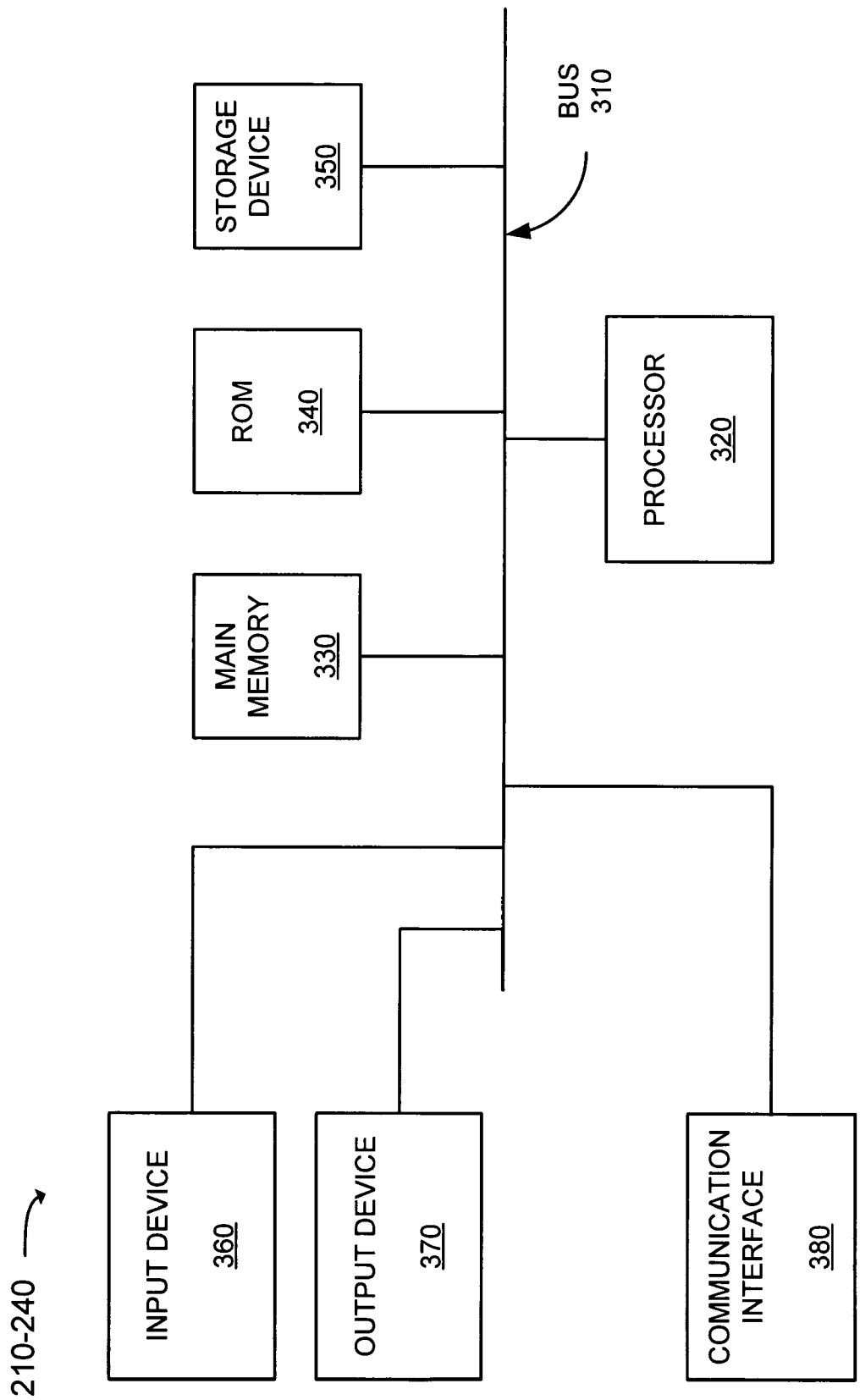
FIG. 3 is an exemplary diagram of a client or server entity in an implementation consistent with the principles of the invention.

FIG. 3 is an exemplary diagram of a client or server entity (hereinafter called "client/server entity"), which may correspond to one or more of clients 210 and/or servers 220-240. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity, consistent with the principles of the invention, may perform certain document processing-related operations. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Computer-Readable Medium

Figure 4:
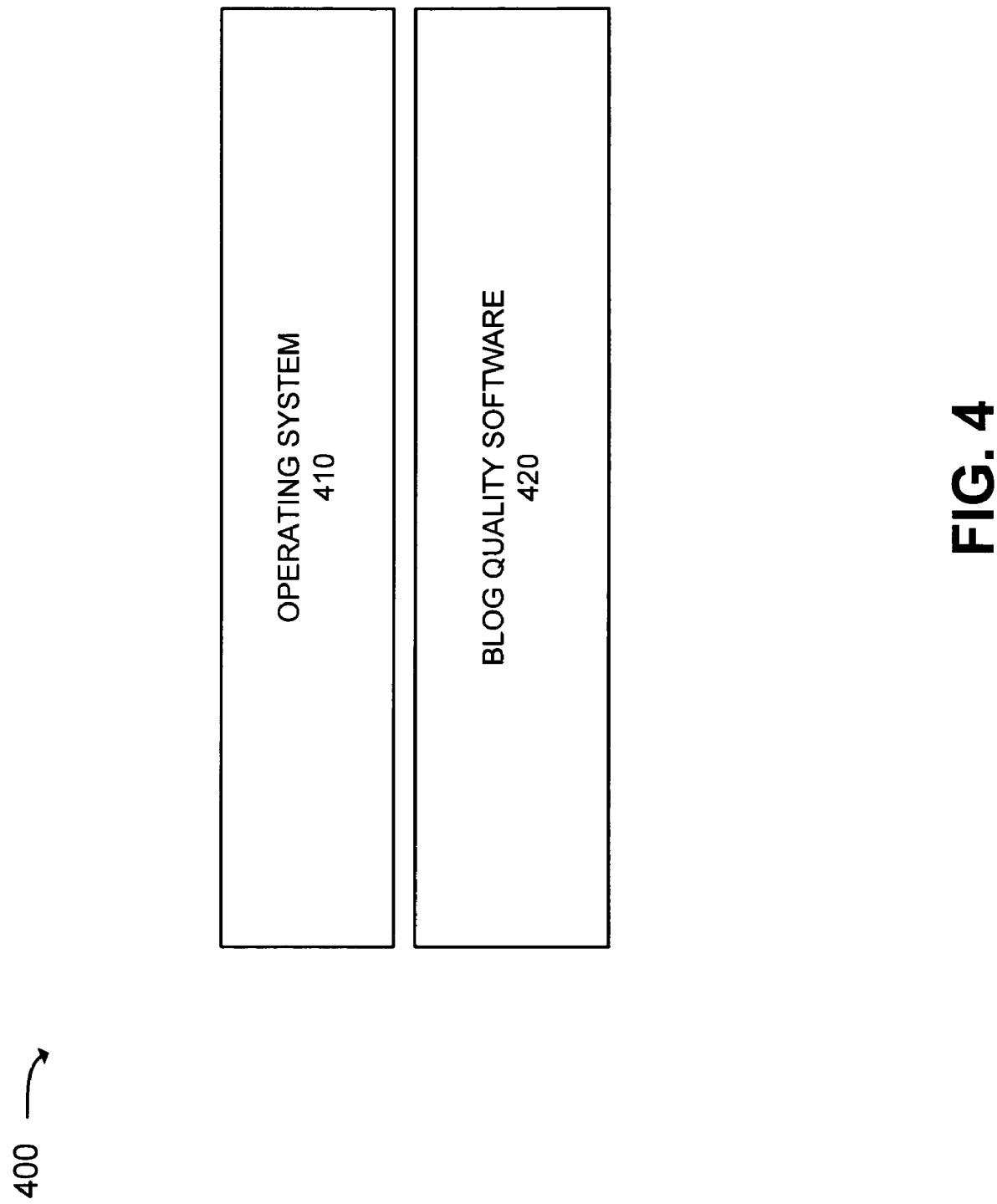
FIG. 4 is a diagram of a portion of an exemplary computer-readable medium that may be used by the server of FIG. 2.

FIG. 4 is a diagram of a portion of an exemplary computer-readable medium 400 that may be used by a server 220. In one implementation, computer-readable medium 400 may correspond to memory 330 of server 220. The portion of computer-readable medium 400 illustrated in FIG. 4 may include an operating system 410 and blog quality software 420.

Operating system 410 may include operating system software, such as the Windows, Unix, or Linux operating systems. Blog quality software 420 may include software that receives data relating to a blog document and determines, based on this data, a quality score for the blog document. As will be described in additional detail below, the data may include signals that measure the probability of the content of the blog document being of poor quality, which would lead to the demotion or elimination of the blog document as a candidate result. The data may also include signals that measure the probability of the content of the blog document being of high quality/popularity, which would lead to the promotion of the blog document as a candidate result.

FIG. 5 is an exemplary database 500 that may be associated with server 220 in an implementation consistent with the principles of the invention. Database 500 may be stored locally at server 220, for example, in main memory 330 or storage device 350, or stored external to server 220 at, for example, a possibly remote location. As illustrated, database 500 may include the following exemplary fields: a document identification (ID) field 510 and a quality score field 520. It will be appreciated that database 500 may include other fields than those illustrated in FIG. 5.

Document ID field 510 may store information identifying blog documents, which, as described above, can be blogs or blog posts. The information may include a unique identifier. Quality score field 520 may store a quality score for each blog document identified in field 510. Database 500 may be accessed in response to a search query received by server 220. Server 220 may promote, demote, or even eliminate a blog document (i.e., blog and/or post) from a set of search results based on the quality score from field 520.

Determining a Quality Score for a Blog Document

Figure 6:
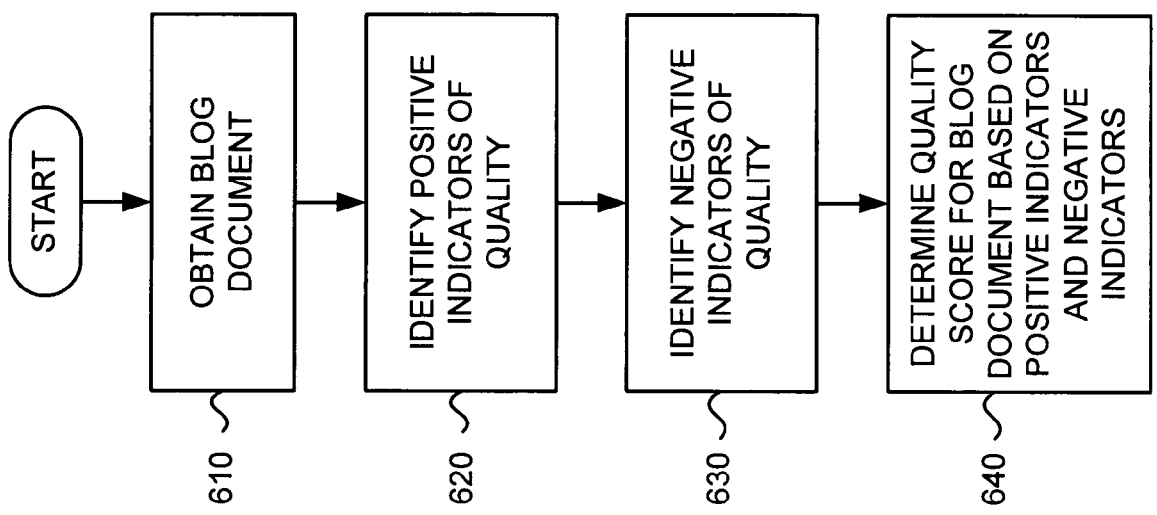
FIG. 6 is a flow chart of an exemplary process for determining a quality score for a blog document in an implementation consistent with the principles of the invention.

FIG. 6 is a flow chart of an exemplary process for determining a quality score for a blog document in an implementation consistent with the principles of the invention. Processing may begin by obtaining information regarding a blog document to be scored (act 610). The information may include the blog itself, the post, metadata from the blog, and/or one or more feeds associated with the blog document.

Positive indicators as to the quality of the blog document may be identified (act 620). Such indicators may include a popularity of the blog document, an implied popularity of the blog document, the existence of the blog document in blogrolls, the existence of the blog document in a high quality blogroll, tagging of the blog document, references to the blog document by other sources, and a pagerank of the blog document. It will be appreciated that other indicators may also be used.

The popularity of the blog document may be a positive indication of the quality of that blog document. A number of news aggregator sites (commonly called "news readers" or "feed readers") exist where individuals can subscribe to a blog document (through its feed). Such aggregators store information describing how many individuals have subscribed to given blog documents. A blog document having a high number of subscriptions implies a higher quality for the blog document. Also, subscriptions can be validated against "subscriptions spam" (where spammers subscribe to their own blog documents in an attempt to make them "more popular") by validating unique users who subscribed, or by filtering unique Internet Protocol (IP) addresses of the subscribers.

An implied popularity may be identified for the blog document. This implied popularity may be identified by, for example, examining the click stream of search results. For example, if a certain blog document is clicked more than other blog documents when the blog document appears in result sets, this may be an indication that the blog document is popular and, thus, a positive indicator of the quality of the blog document.

The existence of the blog document in blogrolls may be a positive indication of the quality of the blog document. It will be appreciated that blog documents often contain not only recent entries (i.e., posts), but also "blogrolls," which are a dense collection of links to external sites (usually other blogs) in which the author/blogger is interested. A blogroll link to a blog document is an indication of popularity of that blog document, so aggregated blogroll links to a blog document can be counted and used to infer magnitude of popularity for the blog document.

The existence of the blog document in a high quality blogroll may be a positive indication of the quality of the blog document. A high quality blogroll is a blogroll that links to well-known or trusted bloggers. Therefore, a high quality blogroll that also links to the blog document is a positive indicator of the quality of the blog document.

Simlarly, the existence of the blog document in a blogroll of a well-known or trusted blogger may also be a positive indication of the quality of the blog document. In this situation, it is assumed that the well-known or trusted blogger would not link to a spamming blogger.

Tagging of the blog document may be a positive indication of the quality of the blog document. Some existing sites allow users to add "tags" to (i.e., to "categorize") a blog document. These custom categorizations are an indicator that an individual has evaluated the content of the blog document and determined that one or more categories appropriately describe its content, and as such are a positive indicator of the quality of the blog document.

References to the blog document by other sources may be a positive indication of the quality of the blog document. For example, content of emails or chat transcripts can contain URLs of blog documents. Email or chat discussions that include references to the blog document is a positive indicator of the quality of the blog document.

The pagerank of the blog document may be a positive indicator of the quality of the blog document. A high pagerank (a signal usually calculated for regular web pages) is an indicator of high quality and, thus, can be applied to blog documents as a positive indication of the quality of the blog documents. In some implementations, a blog document (e.g., a post) may not be associated with a pagerank (e.g., when the post is new). In those situations, the new post may inherit the pagerank of the blog with which it is associated until such time that an independent pagerank is determined for the new post. This inherited pagerank may serve as a positive indication of the quality of the new post.

Negative indicators as to the quality of the blog document may be identified (act 630). Such indicators may include a frequency of new posts on the blog document, the content of the posts in the blog document, a size of the posts in the blog document, a link distribution of the blog document, and the presence of ads in the blog document. It will be appreciated that other indicators may also be used.

The frequency at which new posts are added to the blog document may be a negative indication of the quality of that blog document. Feeds typically include only the most recent posts from a blog document. Spammers often generate new posts in spurts (i.e., many new posts appear within a short time period) or at predictable intervals (one post every 10 minutes, or a post every 3 hours at 32 minutes past the hour). Both behaviors are correlated with malicious intent and can be used to identify possible spammers. Therefore, if the frequency at which new posts are added to the blog document matches a predictable pattern, this may be a negative indication of the quality of the blog document.

The content of the posts in the blog document may be a negative indication of the quality of that blog document. A feed typically contains some or all of the content of several posts from a given blog document. The blog document itself also includes the content of the posts. Spammers may put one version of content into a feed to improve their ranking in search results, while putting a different version on their blog document (e.g., links to irrelevant ads). This mismatch (between feed and blog document) can, therefore, be a negative indication of the quality of the blog document.

Also, in some instances, particular content may be duplicated in multiple posts in a blog document, resulting in multiple feeds containing the same content. Such duplication indicates the feed is low quality/spam and, thus, can be a negative indication of the quality of the blog document.

The words/phrases used in the posts of a blog document may also be a negative indication of the quality of that blog document. For example, from a collection of blog documents and feeds that evaluators rate as spam, a list of words and phrases (bigrams, trigrams, etc.) that appear frequently in spam may be extracted. If a blog document contains a high percentage of words or phrases from the list, this can be a negative indication of quality of the blog document.

The size of the posts in a blog document may be a negative indication of quality of the blog document. Many automated post generators create numerous posts of identical or very similar length. As a result, the distribution of post sizes can be used as a reliable measure of spamminess. When a blog document includes numerous posts of identical or very similar length, this may be a negative indication of quality of the blog document.

A link distribution of the blog document may be a negative indication of quality of the blog document. As disclosed above, some posts are created to increase the pagerank of a particular blog document. In some cases, a high percentage of all links from the posts or from the blog document all point to ether a single web page, or to a single external site. If the number of links to any single external site exceeds a threshold, this can be a negative indication of quality of the blog document.

The presence of ads in the blog document may be a negative indication of quality of the blog document. If a blog document contains a large number of ads, this may be a negative indication of the quality of the blog document.

Moreover, blog documents typically contain three types of content: the content of recent posts, a blogroll, and blog metadata (e.g., author profile information and/or other information pertinent to the blog document or its author). Ads, if present, typically appear within the blog metadata section or near the blogroll. The presence of ads in the recent posts part of a blog document may be a negative indication of the quality of the blog document.

A quality score for the blog document may be determined based on these indicators (act 640). For example, in one implementation, the quality score for a blog document may be determined by assigning a weight to the different indicators and combining the weights to obtain a quality score. The indicators may be combined and/or weighted in any manner. For example, in one implementation consistent with the principles of the invention, each indicator may be given a positive or negative value. These values may be added together to determine a quality score for the blog document. Alternatively, each indicator value may be multiplied by a corresponding factor (or weight) and the resulting values may be totaled to give the quality score for the blog document. Other techniques for determining the quality score may alternatively be used.

Once the quality score for the blog document has been determined, it may be associated with the blog document. For example, the quality score may be associated, in a database, such as database 500, with information identifying the blog document for which the score has been determined. In this manner, database 500 may be populated with quality scores for blog documents. The quality scores can be updated periodically.

Presenting Search Results

Figure 7:
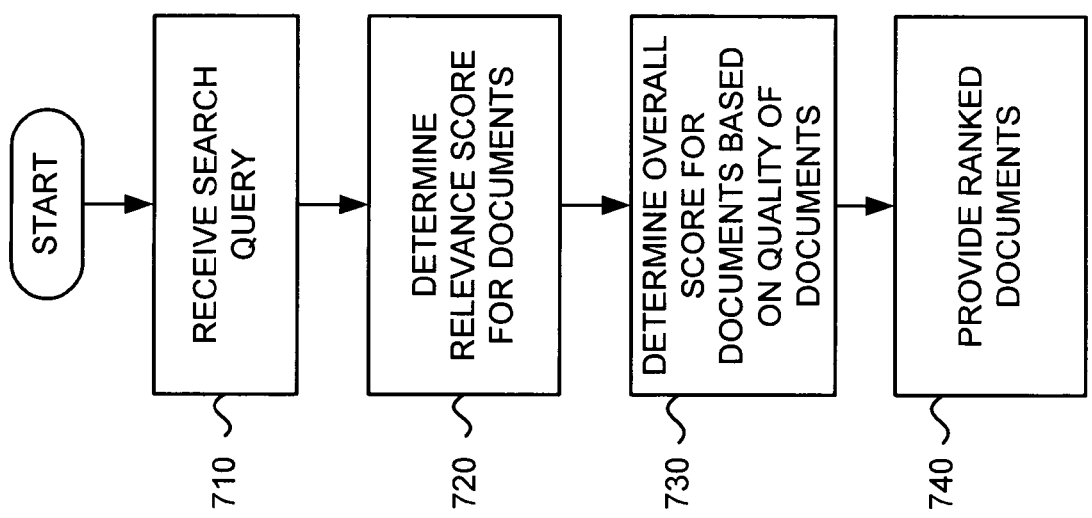
FIG. 7 is a flowchart of an exemplary process for presenting search results in an implementation consistent with the principles of the invention.

FIG. 7 is a flowchart of an exemplary process for presenting search results. In one implementation, the processing of FIG. 7 may be performed by one or more software and/or hardware components within server 220. In another implementation, the processing may be performed by one or more software and/or hardware components within another device or a group of devices separate from or including server 220.

Processing may begin with a search query being received (act 710). For example, the user may provide a search query into a search box associated with a search engine (e.g., entering a search term into a search engine interface or a search box of an add-on toolbar). The web browser (or the add-on toolbar) may send the search query to a search engine, such as search engine 225 associated with server 220.

A relevance score for a set of documents may be determined based on the search query (act 720). For example, server 220 may determine an information retrieval (IR) score for the documents. The IR score for a document may be determined based on a matching of the search terms of a search query to the content of the document. There are a number of known techniques that may be used to determine the IR score for a document. For example, the IR score may be determined based on the number of occurrences of the search terms in the document. Alternatively or additionally, the IR score may be determined based on where the search terms occur within the document (e.g., title, content, etc.) or characteristics of the search terms (e.g., font, size, color, etc.). Alternatively or additionally, a search term may be weighted differently from another search term when multiple search terms are present. Alternatively or additionally, the proximity of the search terms when multiple search terms are present may influence the IR score. Yet other techniques for determining the IR score for a document are known to those skilled in the art.

An overall score for the documents may be determined based on the quality of the documents (act 730). For example, the IR score for each document may be combined with the document's quality score to determine the overall score. Combining the scores may cause the IR scores for the documents to be adjusted based on the quality scores, thereby raising or lowering the scores or, in some cases, leaving the scores the same to obtain the overall scores. Alternatively, the documents may be scored based on the quality scores alone without generating IR scores. In any event, overall scores may be determined for the documents using the quality scores.

A ranked set of documents may be provided to the user based on the overall scores for the documents (act 740). In this way, the quality of documents may be used to improve the search results provided to users.

EXAMPLE

The following example illustrates the above processing. Assume that a user is interested in blogs about fantasy football. The user may submit the search query "fantasy football" to a search engine, such as search engine 225. In response, assume that search engine 225 retrieves a group of blog documents based on their relevance to the search query (e.g., using an IR technique).

FIG. 8 is a diagram of an exemplary set of blog documents received in response to the search query. As illustrated, search engine 225 retrieved five blog documents (blog documents 1-5) with the following relevance (or IR) scores: blog document 1 has an IR score of 1.0, blog document 2 has an IR score of 0.9, blog document 3 has an IR score of 0.8, blog document 4 has an IR score of 0.7, and blog document 5 has an IR score of 0.6. Assume, for explanatory purposes, that these five blog documents have the following quality scores: blog document 1 has a positive quality score of 0.4, blog document 2 has a negative quality score of −0.4, blog document 3 has a positive quality score of 0.8, blog document 4 has a positive quality score of 0.3, and blog document 5 has a positive quality score of 0.3.

Search engine 225 may determine an overall score for the blog documents by adding the relevance score to the quality score. In this case, blog document 1 would have an overall score of 1.4, blog document 2 would have an overall score of 0.5, blog document 3 would have an overall score of 1.6, blog document 4 would have an overall score of 1.0, and blog document 5 would have an overall score of 0.9. Therefore, search engine 225 may provide blog documents 1-5 to the user in the following order: blog document 3, blog document 1, blog document 4, blog document 5, and blog document 2.

As evident from the example of FIG. 8, the quality of blog documents may cause the ranking of those documents to increase or decrease. In this way, higher quality results are provided to the user.

CONCLUSION

Implementations consistent with the principles of the invention improve blog searching by taking into consideration the quality of the blogs.

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 6 and 7, the order of the acts may be modified in other implementations consistent with the principles of the invention. Further, non-dependent acts may be performed in parallel.

The preceding description refers to a user. A "user" is intended to refer to a client, such as a client 210 (FIG. 2), or an operator of a client.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more servers, the method comprising:
 receiving, by a blog search engine of the one or more servers, a search query;
 identifying, by the blog search engine of the one or more server devices, a blog document that is responsive to the search query;
 generating, by the blog search engine of the one or more server devices, a relevance score for the blog document, the relevance score being based on a relevance of the blog document to the search query;
 generating, by the blog search engine of the one or more server devices, a quality score for the blog document, the quality score based on quality of the blog document independent of the search query,
 where the quality score is based on a plurality of indicators that include at least one of one or more positive indicators or one or more negative indicators,
 where the plurality of indicators include:
  a quantity of ads in the blog document, and
  an indication of whether the blog document includes tags that have been added by users who have accessed the blog document;
 generating, by the blog search engine of the one or more server devices, a ranking score based on the relevance score and the quality score; and
 providing, by the blog search engine of the one or more servers, information regarding the blog document based on the ranking score.

2. The method of claim 1, where the one or more positive indicators include a popularity of the blog document.

3. The method of claim 1, where the generating the quality score of the blog document includes:
 combining the one or more positive indicators and the one or more negative indicators.

4. The method of claim 1, where the generating the ranking score includes:
 increasing or decreasing the relevance score based on the quality score.

5. A computer-implemented system comprising:
 one or more memory devices to store instructions; and
 one or more server devices executing the instructions, to:
  receive a search query for a blog search engine;
  identify a blog document that is responsive to the search query;
  generate a first score for the blog document based on a relevance of the blog document to the search query;
  generate a second score for the blog document based on a quality of the blog document independent of the search query,
  where the second score is based on a plurality of indicators that include at least one of one or more positive indicators or one or more negative indicators,
  where the plurality of indicators include:
   an indication of whether first content in a blog feed, that is derived from the blog document, matches second content from one or more posts to the blog document, where the first content is not derived from a post to the blog document;
  generate a third score based on the first and second scores; and
  provide information relating to the blog document based on the third score.

6. A computer-implemented device comprising:
one or more memory devices to store instructions; and
one or more processors executing the instructions to:
- receive a search query;
- identify a plurality of blog documents that are responsive to the search query;
- generate a relevance score for each blog document in the plurality of blog documents, where the relevance score for a particular blog document is based on a relevance of the particular blog document to the search query;
- generate a quality score for each blog document in the plurality of blog documents, where the quality score of the particular blog document is based on a quality of the particular blog document, independent of the search query,
- where the quality score is based on a plurality of indicators that include at least one of one or more positive indicators or one or more negative indicators,
- where the plurality of indicators include:
  - a location of ads in the particular blog document, and
  - an indication of whether multiple blog feeds, that are based on the particular blog document, include duplicate content;
- generate a ranking score for each of the plurality of blog documents based on the respective generated relevance and quality scores;
- rank the plurality of blog documents in an order based on the ranking scores of the plurality of blog documents; and
- present information regarding the plurality of blog documents in the ranked order.

7. A non-transitory computer-readable memory device storing instructions for controlling one or more processors to:
- receive a search query;
- identify documents that are responsive to the search query, the documents including a blog document;
- generate a relevance score for each of the documents, where the relevance score for the blog document is based on a relevance of the blog document to the search query;
- generate a quality score for each of the documents, where the quality score for the blog document is based on a quality of the blog document, independent of the search query,
- where the quality score, for the blog document, is based on a plurality of indicators that include at least one of one or more positive indicators or one or more negative indicators,
- where the plurality of indicators include:
  - an indication of whether a plurality of posts to the blog document are of a similar or identical length;
- generate a ranking score for each of the documents based on the respective relevance and quality scores; and
- provide information regarding the documents based on the ranking scores of the documents.

8. The method of claim 1, where generating the ranking score comprises adding the first relevance score and the quality score.

9. The computer-implemented device of claim 6, where the presented ranked order is different from a ranked order that is solely based on relevance of the blog documents to the search query.

10. A method performed by one or more server devices, the method comprising:
- receiving, by a blog search engine of the one or more server devices, a search query;
- identifying, by the blog search engine of the one or more server devices, a blog document that is responsive to the search query;
- generating, by the blog search engine of the one or more server devices, a relevance score for the blog document, the relevance score being based on a relevance of the blog document to the search query;
- generating, by the blog search engine of the one or more server devices, a quality score for the blog document, the quality score based on quality of the blog document independent of the search query,
- where the quality score is based on a plurality of indicators that include at least one of one or more positive indicators or one or more negative indicators,
- where the one or more positive indicators include an indication that the blog document is referenced in a blogroll;
- where the one or more negative indicators include a location of ads in the blog document;
- generating, by the blog search engine of the one or more server devices, a ranking score based on the relevance score and the quality score; and
- providing, by the blog search engine of the one or more server devices, information regarding the blog document based on the ranking score.

11. The method of claim 10, where the one or more positive indicators include an existence of a link to the blog document in one or more blogrolls associated with other blog documents.

12. The method of claim 10, where the one or more positive indicators include tagging of the blog document.

13. The method of claim 10, where the one or more positive indicators include a reference to the blog document in other documents.

14. The method of claim 10, where the one or more negative indicators include one or more of a frequency with which posts are added to the blog document.

15. The method of claim 10, where the one or more negative indicators include a content of the blog document.

16. The method of claim 10, where the one or more negative indicators include a size of posts in the blog document.

17. The method of claim 10, where the one or more negative indicators include a link distribution associated with the blog document.

18. A method performed by one or more server devices, the method comprising:
- identifying, by at least one of the one or more server devices, a blog document that is responsive to a search query;
- generating, by at least one of the one or more server devices, a first score for the blog document based on a relevance of the blog document to the search query;
- generating, by at least one of the one or more server devices, a second score for the blog document based on a quality of the blog document independent of the search query,
- where the second score is based on:
  - a location of ads in the blog document,
  - an existence of a link to the blog document in one or more blogrolls associated with other blog documents, and
  - a quality of the one or more blogrolls that include the link to the blog document;
- generating, by at least one of the one or more server devices, a third score based on the first and second scores; and providing, by at least one of the one or more server devices, information relating to the blog document based on the third score.

19. The method of claim 18, where generating the third score includes: increasing or decreasing the first score based on the second score.

20. The method of claim 18, where providing the information relating to the blog document includes:
presenting information regarding the blog document and at least one other document in a first order that is based on the third score, where the first order is different from a second order that is solely based on the first score.

21. A method performed by one or more server devices, the method comprising:
identifying, by at least one of the one or more server devices, a blog document that is responsive to a search query;
generating, by at least one of the one or more server devices, a first score for the blog document based on a relevance of the blog document to the search query;
generating, by at least one of the one or more server devices, a second score for the blog document based on a quality of the blog document independent of the search query,
where the second score is based on:
a first indication of whether ads appear in a blogroll associated with the blog document or blog metadata associated with the blog document, and
a second indication of whether ads appear in blog posts in the blog document;
generating, by at least one of the one or more server devices, a third score based on the first and second scores; and
providing, by at least one of the one or more server devices, information relating to the blog document based on the third score.

22. The method of claim 21, where generating the third score includes: increasing or decreasing the first score based on the second score.

23. The method of claim 21, where providing the information relating to the blog document includes:
presenting information regarding the blog document and at least one other document in a first order that is based on the third score, where the first order is different from a second order that is solely based on the first score.

* * * * *

UNITED STATES PATENT AND TRADEMARK OFFICE
CERTIFICATE OF CORRECTION

PATENT NO. : 8,244,720 B2
APPLICATION NO. : 11/224321
DATED : August 14, 2012
INVENTOR(S) : Andriy Bihun et al.

It is certified that error appears in the above-identified patent and that said Letters Patent is hereby corrected as shown below:

Claim 1, column 10, line 2 should read: "A method performed by one or more server devices, the method"
Claim 1, column 10, line 5 should read: "server devices, a search query;"
Claim 1, column 10, line 16 should read: "quality score being based on a quality of the blog document"
Claim 1, column 10, line 30 should read: "server devices, information regarding the blog document based"
Claim 8, column 11, lines 58-59 should read: "score comprises adding the relevance score and the quality score."
Claim 9, column 11, line 62 should read: "solely based on relevance of the plurality of blog documents to the search"
Claim 14, column 12, lines 36-38 should read: "The method of claim 10, where the one or more negative indicators include a frequency with which posts are added to the blog document."

Signed and Sealed this
Second Day of October, 2012

David J. Kappos
*Director of the United States Patent and Trademark Office*